United States Patent [19]

Ballard et al.

[11] 4,056,669

[45] Nov. 1, 1977

[54] POLYMERIZATION PROCESS

[75] Inventors: Denis George Harold Ballard; Eric Jones; John Christopher Padget; Alexander Joseph Peter Pioli; Peter Anthony Robinson; John Walker; Ronald John Wyatt, all of Runcorn, England

[73] Assignee: Imperial Chemical Industries Limited, London, England

[21] Appl. No.: 377,197

[22] Filed: July 9, 1973

[30] Foreign Application Priority Data

July 13, 1972 United Kingdom ............... 32811/72

[51] Int. Cl.$^2$ .......................... C08F 4/02; C08F 10/02
[52] U.S. Cl. .................................... 526/154; 252/430; 526/126; 526/352; 526/908; 526/909
[58] Field of Search ............... 260/94.9 DA; 526/126, 526/154

[56] References Cited

U.S. PATENT DOCUMENTS

| 3,513,150 | 5/1970 | Matsuura et al. | ........... 260/94.9 DA |
| 3,694,421 | 9/1972 | Vetta | ............................ 260/94.9 DA |
| 3,701,766 | 10/1972 | Delbouille et al. | ......... 260/94.9 DA |

FOREIGN PATENT DOCUMENTS

| 2,012,189 | 3/1970 | France. |
| 2,040,353 | 2/1971 | Germany. |

Primary Examiner—Edward J. Smith
Attorney, Agent, or Firm—Cushman, Darby & Cushman

[57] ABSTRACT

Polymerization of ethylene using a transition metal hydrocarbyl complex, especially zirconium tetrabenzyl, supported on alumina consisting of substantially spherical particles having diameters in the range 20–150 μm. The particulate polymer produced by the process contains substantially no "fines" (i.e. particles <100 μm diameter) and has improved pourability.

5 Claims, No Drawings

POLYMERIZATION PROCESS

This invention relates to the polymerisation of olefinically unsaturated monomers and in particular, to the polymerisation of ethylene to high density polyethylene.

British Pat. No. 1,314,828 describes and claims a process for the polymerisation or copolymerisation of olefinically unsaturated monomers in which the monomer is contacted with a catalyst which comprises a transition metal composition which is the product of reacting a transition metal complex of the general formula $$R_mMX_p$$

with a substantially inert matrix material having a hydroxylic surface which is free from adsorbed water, wherein M is a transition metal of Groups IVA to VIA of the Periodic Table of the Elements, preferably Group IVA, R is a hydrocarbon group or substituted hydrocarbon group, X is a monovalent ligand, and $m$ and $p$ are integers, $m$ having a value from 2 to the highest valency of the metal M and $p$ having a value of from 0 to 2 less than the valency of the metal M. Novel transition metal compositions employed in this process are also claimed.

(All references to the Periodic Table are to that version of the Periodic Table of the Elements printed inside the back cover of "Advanced Inorganic Chemistry" by F. A. Cotton and G. Wilkinson, 2nd Edition, Interscience Publishers, 1966).

In this context, the term "hydroxylic surface" is used to denote a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with, say, the transition metal hydrocarbyl complex, the bulk of the matrix material is chemically inert. Particularly good examples of such matrix materials are silica and alumina or mixtures thereof. These comprise a matrix of silicon or aluminum and oxygen atoms, to the surface of which —OH groups are attached, the hydrogen atoms of said groups having an acidic function. However, apart from the presence of these —OH groups, silica and alumina are generally regarded as chemically inert.

As mentioned in the aforementioned patent, when our catalysts are used for the polymerisation of ethylene, a preferred matrix material is alumina. We have now found that a polyethylene powder having especially good free-flowing properties may be prepared by our process if the alumina particles conform to certain specifications.

According to the present invention, we provide a process for the polymerisation or copolymerisation of ethylene in which the ethylene is contacted with a catalyst comprising a transition metal composition, which is the product of reacting a transition metal complex of general formula $MR_m$, where M is a metal of Group IVa, chromium or vanadium, R is a hydrocarbon or substituted hydrocarbon group and $m$ is an integer having a value equal to the valency of metal M, with particulate alumina which is free from adsorbed water, and which consists essentially of generally spherical particles, devoid of sharp edges and has substantially no particles with diameters less than 20 $\mu$.

The diameters of the alumina particles will commonly have a practical upper limit of 150 $\mu$; but the use of alumina particles somewhat larger than this is not excluded. However, the diameters of the alumina particles are preferably within the range of 50 to 150 $\mu$. The most important aspect of particle size control concerns the elimination of "fines", that is, particles having diameters less than 20 $\mu$. It has been found that if a substantial proportion of such particles are present in the alumina matrix of the catalyst, the polymer particles produced using it have much poorer flow characteristics than those produced using alumina free of particles <20 $\mu$ diameter. Furthermore, the consequent lowering of the "fines" content of the polymer powder produced (i.e. the fraction <100 $\mu$) reduces the dust and explosions hazards commonly associated with polymer and other fine powders.

When polyethylene is produced using the process of the present invention, the size and shape of the polymer particles is largely dictated by the size and shape of the particles of alumina. For example, the use of spherical alumina particles, especially spray dried alumina, gives rise to substantially spherical polyethylene particles.

Thus, it will be appreciated that, apart from lowering the "fines" content of the polymer powder produced by our process, it is possible to produce a polymer powder having a desired particle size distribution by controlling the particle size distribution of the alumina used in the preparation of the catalyst composition.

As previously mentioned, the inert matrix, in the present case alumina, must be freed from adsorbed moisture before reaction with the transition metal complex to form the catalyst composition. This may be accomplished in any convenient way as described in our aforementioned copending patent application, but the alumina is preferably heated to remove moisture. However, it is essential that the heating is not at such a temperature and/or for such a time as to remove the surface hydroxyl groups.

A convenient drying procedure is to load the alumina into a rotating tube furnance and heat it to about 500° C while passing dry nitrogen, or other inert gas, over the mouth of the tubes.

Fluidised bed dryers may advantageously be employed instead of a rotating tube furnace.

The drying time will depend on the grade of alumina and on the heating temperature; but 2 hours has been found to be generally convenient. However, greater or less times may be employed as appropriate.

A particularly suitable form of alumina having generally spherical particles is the so-called "spray-dried" alumina. Such aluminas are available commercially, for example, the alumina supplied under the designation "Grade B", by Koninklijke Zwavelzuurfabrieken, v/h Ketjet NV of Amsterdam, The Netherlands.

It is preferred that the alumina should be in the $\gamma$ form when it is reacted with the transition metal complex; but it is not essential that $\gamma$ alumina should be used as starting material. For example, the aforementioned Grade B alumina is, in fact, a Boehmite; but it is transformed to $\gamma$ alumina during heat-treatments such as those described above for drying the alumina.

The activity of our catalyst compositions using the specified alumina particles as matrix material is generally such that each polymer particle has a diameter in the range 5 to 15 times that of the original alumina particle now dispersed within it. Thus, in order to produce polymer particles of the most convenient diameter, say 500 to 1500 μ, it is again preferred that the diameters of the alumina particles should be in the range 50 to 150 μ. Preferably all the alumina particles should be within this size range and, as has been already mentioned, the presence of particles having diameters <20 μ, should be avoided or kept to a minimum. However, it will be appreciated that fines may be produced during handling of the alumina, for example by attrition. Thus operations likely to aggravate such attrition should be kept to a minimum.

The alumina may be graded by any convenient means, for example, by sieving or by air classification. Preferably the alumina is graded before it is reacted with the appropriate transition metal complex to produce the catalyst.

Catalyst compositions for use in the process of transition metal complex with the graded alumina powder, as described in our aforementioned British Pat. No. 1,314,828.

The complexes referred to in said patent may be used in the practice of the present invention.

Suitable hydrocarbon groups R, which may be the same or different, include alkyl and alkenyl groups (including $\pi$-alkenyl groups such as $\pi$-allyl), or substituted derivatives thereof. But a preferred class of hydrocarbon groups are the substituted alkyls of general formula —$CH_2Y$, where Y may be an aromatic or polyaromatic group such as phenyl or naphthyl; or a ring-substituted derivative such as p-methyl phenyl. Y may also comprise a group of general formula $Z(R^1)_3$, where Z represents silicon, germanium, tin or lead and $R^1$ represents a hydrocarbon group or hydrogen preferably Z is silicon.

Suitable transition metals include titanium, zirconium, chromium, and vanadium, but the metals of Group IVA, especially zirconium, are preferred, since they commonly possess the highest catalytic activity and the residues which they produce are usually colourless and of exceptionally low toxicity. It will be appreciated that the preferred transition metal complexes defined above are halide-free and thus the catalyst residues which they generate are non-corrosive.

Examples of suitable transition metal complexes include zirconium tetra(benzyl), zirconium tetrakis(trimethyl silyl methylene), titanium tetra(benzyl), zirconium and titanium tetrakis(1-methylene-1-naphthyl), and chromium tris(trimethyl silyl methylene).

Polymerisations of ethylene, preferably using the composition in the form of a slurry, may be carried out under a wide range of conditions, as described in said patent. However, in order to control the molecular weight of the product, it is usually desirable to use hydrogen modification, especially as described in our co-pending British patent application of even date 32809/72.

The invention will be illustrated by the following Examples.

EXAMPLE 1

Ketjen Grade B alumina was sieved to 20–150 μ and dried at 500° C for 2 hours under an atmosphere of nitrogen. The alumina was cooled under nitrogen and a solution of zirconium tetrabenzyl in decalin (20% w/v) was added and the mixture stirred. The resultant slurry was allowed to settle and the supernatant liquid was syphoned off. Further zirconium tetrabenzyl solution was then added until the proportion of zirconium tetrabenzyl was about 0.5 m mole/g. of alumina. The coated alumina was washed with hexane and finally made up as a 10–20% (weight/volume) slurry in hexane.

A stirred polymerisation vessel (4.0 m$^3$) was charged with hexane (2.0 m$^3$) and pressurised with ethylene and hydrogen. Ethylene was fed to the reactor at 140 kg/hour and hydrogen fed at a suitable rate to maintain a hydrogen/ethylene ratio of 1.35. Catalyst slurry was injected into the reactor to start polymerisation, the working pressure being maintained at 6 kg/cm$^2$ and working temperature at 80° C. Polyethylene was formed as a slurry of particles which was withdrawn from the reactor to a let-down vessel and centrifuged. The resulting granular polymer product was passed through a fluidised bed dryer. The MFI (melt flow index) of the product was 0.02.

The product was a free flowing powder with the following characeristics.

Particle Size Distribution

TABLE I

| Particle Size μ | Weight % |
|---|---|
| 0–150 | 1.1 |
| 150–250 | 1.2 |
| 250–500 | 10.3 |
| 500–840 | 45.8 |
| 840–1200 | 40.9 |

Pourability

This was determined using a standard test (ASTM D1895) in which the time taken for 100 g. of powder to flow through a standard funnel is measured. The time taken by a sample of polyethylene powder produced according to the above procedure to flow through the funnel was compared with times taken by similar powders produced using alumina having particles <20 μ. The results are summarised in Table 2 below.

TABLE 2

| | Wt. % of alumina <20 μ dia. | | |
|---|---|---|---|
| Flow time | nil | 9 | 20 |
| (secs) | 25.4 | 29.4 | 41.6 |

Dust Explosion Test

A sample of polymer prepared as in Example 1 was subjected to the Standard Hartmann Test for determining maximum explosion characteristics. The results obtained are given below:

| Maximum Pressure | 14.0 psi |
|---|---|
| Time to Max Pressure | 56.9 m.sec. |
| Max Rate of Pressure Rise | 0.5 psi/m.sec. |
| Mean Rate of Pressure Rise | 0.2 psi/m.sec. |
| Concentration | 3.0 to 4.0 g/l. |

These results indicated that the explosion was an extremely soft one, with a very low rate of pressure rise to a low maximum pressure.

EXAMPLES 2 to 4

General Procedure

A 4 liter stainless steel stirrable autoclave was dried, purged with nitrogen and heated to 65° C. Dry, oxygen-free hexane (2 liters) was added by a suspension of catalyst in hexane (0.1 m atom Zr). The reactor was sealed and addition of hydrogen (100 liters/hr) and ethylene (300 liters/hr) started. When the pressure reached 250 psig the stirrer was started and excess gas vented off through a pressure control valve. The rate of reaction was followed by measuring the volume of gas vented, the reaction temperature being controlled at 80° C. After 3½ hours, the ethylene/hydrogen flow was stopped and the reactor cooled and vented. The polymer slurry was removed, cooled to room temperature and filtered. The polymer was dried in vacuo and weighed.

The catalyst used in each case was prepared by reacting a solution of zirconium tetrabenzyl with alumina as described under Example 1; but in these later Examples a more closely graded fraction of alumina was used. It will be seen from the results given in Table 3 that using our process, the particle size distribution of the polymer powder may be controlled by controlling the particle size distribution of the alumina used in the preparation of the catalyst composition from which it is prepared.

TABLE 3

| Example No. | Particle Size ($\mu$) | |
|---|---|---|
| | $Al_2O_3$ Particles | Polymer Particles |
| 2 | 20–45 | 250–600 (86%) |
| 3 | 75–100 | 840–1680 (99%) |
| 4 | 100–150 | 1200–2000 (91%) |

We claim:

1. A process for the polymerisation of ethylene in which the ethylene is contacted with a catalyst comprising a transition metal composition which is the product of reacting a transition metal complex of general formula $MR_m$, where M is a metal of Group IVa, chromium or vanadium, R is selected from the group consisting of alkyl, alkenyl, and substituents of the formula —$CH_2Y$, where Y is selected from the group consisting of aromatic groups, polyaromatic groups and groups of formula $Z(R^1)_3$, where Z is silicon, germanium, tin or lead and each $R^1$ is hydrocarbon or hydrogen and $m$ is an integer having a value equal to the valency of metal M, with particulate alumina which is free from adsorbed water, and which consists essentially of generally spherical particles, devoid of sharp edges, and has substantially no particles with diameters less than 20 $\mu$.

2. A process as claimed in claim 1 in which the alumina particles are between 50 and 150 $\mu$.

3. A process as claimed in claim 1 in which the alumina is a spray-dried alumina.

4. A process as claimed in claim 1 in which the metal used is zirconium.

5. A process as claimed in claim 4 in which the transition metal complex used is zirconium tetrabenzyl.

* * * * *